United States Patent
Slocum

(10) Patent No.: US 9,770,015 B2
(45) Date of Patent: Sep. 26, 2017

(54) FISHING LURE WITH BLOW-HOLE VENTED BAIT CHAMBER AND O-RING HATCH LOCKING MECHANISM

(71) Applicant: Terry Scott Slocum, Washougal, WA (US)

(72) Inventor: Terry Scott Slocum, Washougal, WA (US)

(*) Notice: Subject to any disclaimer, the term of this patent is extended or adjusted under 35 U.S.C. 154(b) by 9 days.

(21) Appl. No.: 14/824,439

(22) Filed: Aug. 12, 2015

(65) Prior Publication Data

US 2016/0057982 A1    Mar. 3, 2016

Related U.S. Application Data

(60) Provisional application No. 62/045,485, filed on Sep. 3, 2014.

(51) Int. Cl.
| | | |
|---|---|---|
| *A01K 85/01* | (2006.01) | |
| *A01K 85/18* | (2006.01) | |
| *A01K 97/02* | (2006.01) | |
| *A01K 97/05* | (2006.01) | |

(52) U.S. Cl.
CPC .............. *A01K 85/01* (2013.01); *A01K 85/18* (2013.01); *A01K 97/02* (2013.01); *A01K 97/05* (2013.01)

(58) Field of Classification Search
CPC ........................................ A01K 85/01
USPC .................. 43/42.06, 42.31, 42.28
See application file for complete search history.

(56) References Cited

U.S. PATENT DOCUMENTS

| | | | | |
|---|---|---|---|---|
| 1,345,173 A | * | 6/1920 | Halder ........... | A01K 85/02 43/35 |
| 1,913,362 A | * | 6/1933 | Catarau .......... | A01K 85/01 43/42.06 |
| 2,004,308 A | * | 6/1935 | Catarau .......... | A01K 85/01 43/42.06 |
| 2,008,004 A | * | 7/1935 | Catarau .......... | A01K 85/01 43/42.06 |

(Continued)

FOREIGN PATENT DOCUMENTS

| | | | | |
|---|---|---|---|---|
| AU | WO 9001264 A1 | * | 2/1990 | ........... A01K 85/01 |
| AU | WO 2005077163 A1 | * | 8/2005 | ........... A01K 85/01 |

(Continued)

OTHER PUBLICATIONS

Brad's 2013 Catalog. Brad's (R) Killer fishing gear, Apr. 21, 2014 [Retrieved on Aug. 27, 2015]. Retrieved from the Internet: <ULR: www.bsfishtales.com/pdf/BradsCatalog.pdf>.

*Primary Examiner* — Darren W Ark
(74) *Attorney, Agent, or Firm* — Rylander & Associates, PC; Philip R. M. Hunt

(57) ABSTRACT

A fishing lure comprising a solid, banana-shaped lure body of buoyant urethane with a bait chamber in a recess of the lure body, the bait chamber covered by a hatch coupled to the lure body with a hinge. Scent producing material may be placed in the bait chamber. A blowhole tunnel passes through the lure body from the lure body head to the bait chamber. Motion of the lure forces water through the blowhole into the bait chamber and carries scent from scent producing material through holes in the hatch. A first groove in the lure body tail is configured such that an O-ring in the first groove holds the hatch against the lure body. A second groove in the lure body tail is configured such that when the O-ring is in the second groove, the hatch is free to open and close.

10 Claims, 4 Drawing Sheets

(56) References Cited

U.S. PATENT DOCUMENTS

| | | | | |
|---|---|---|---|---|
| 2,302,206 | A * | 11/1942 | Gibson | A01K 83/06 43/41 |
| 2,617,226 | A * | 11/1952 | Yoshii | A01K 85/18 43/42.05 |
| 2,910,800 | A * | 11/1959 | Cicala | A01K 85/01 43/42.06 |
| 2,911,752 | A * | 11/1959 | Leppich | A01K 97/18 43/42.28 |
| 2,937,467 | A * | 5/1960 | Capps | A01K 85/01 43/42.06 |
| 2,994,982 | A * | 8/1961 | Murawski | A01K 85/02 43/42.06 |
| 3,108,389 | A * | 10/1963 | McGuire | A01K 85/00 43/42.06 |
| 3,205,608 | A * | 9/1965 | Dickinson | A01K 85/16 43/42.06 |
| 3,434,230 | A * | 3/1969 | Littlefield | A01K 85/01 43/42.06 |
| 3,708,903 | A * | 1/1973 | Bercz | A01K 85/01 43/17.6 |
| 3,844,060 | A * | 10/1974 | Kurachi | A01K 85/16 43/41 |
| 3,913,257 | A * | 10/1975 | Colgan | A01K 85/16 43/42.09 |
| 4,044,490 | A * | 8/1977 | Young | A01K 85/01 43/42.06 |
| 4,047,317 | A * | 9/1977 | Pfister | A01K 85/01 43/42.06 |
| 4,205,476 | A * | 6/1980 | Hsu | A01K 85/01 43/42.06 |
| 4,231,179 | A | 11/1980 | Hillesland | |
| 4,267,658 | A * | 5/1981 | Brown | A01K 85/01 43/42.06 |
| 4,337,591 | A * | 7/1982 | Gell | A01K 85/16 43/42.09 |
| 4,520,588 | A * | 6/1985 | Hindermyer | A01K 85/01 43/17.6 |
| 4,553,348 | A * | 11/1985 | Cooper | A01K 85/01 43/42.06 |
| 4,800,670 | A * | 1/1989 | Mattison | A01K 85/01 43/17.6 |
| 4,888,907 | A | 12/1989 | Gibbs | |
| 5,097,620 | A * | 3/1992 | Nietupski | A01K 85/01 43/42.06 |
| 5,155,947 | A * | 10/1992 | Rivard | A01K 85/16 43/42.06 |
| 5,155,948 | A * | 10/1992 | Kitagawa | A01K 85/00 43/42.28 |
| 5,261,181 | A * | 11/1993 | Melton | A01K 85/00 43/42.06 |
| 5,446,991 | A | 9/1995 | Brackus | |
| 5,471,780 | A | 12/1995 | Hopson | |
| 5,517,781 | A * | 5/1996 | Paoletta, Jr. | A01K 85/01 43/42.06 |
| 5,586,405 | A * | 12/1996 | Fike | A01K 85/16 43/42.31 |
| 5,661,921 | A * | 9/1997 | Mason | A01K 85/16 43/42.06 |
| 6,079,145 | A * | 6/2000 | Barringer | A01K 85/16 43/42.06 |
| 6,158,161 | A | 12/2000 | Rossman | |
| 6,588,138 | B1 * | 7/2003 | Gilbert | A01K 85/01 43/42.06 |
| 6,779,293 | B1 * | 8/2004 | Rice | A01K 85/01 43/42.06 |
| 6,789,349 | B1 * | 9/2004 | Stone | A01K 85/01 43/42.06 |
| D500,831 | S * | 1/2005 | Warburton | D22/126 |
| 6,836,997 | B2 | 1/2005 | Cramsey | |
| 6,922,937 | B1 * | 8/2005 | Gilbert | A01K 85/01 43/42.06 |
| 6,931,785 | B1 * | 8/2005 | Johnson | A01K 85/16 43/42.06 |
| D513,780 | S * | 1/2006 | Jakeman | D22/126 |
| 7,114,285 | B1 * | 10/2006 | Ince | A01K 85/00 43/42.28 |
| 7,174,669 | B1 * | 2/2007 | Kallas | A01K 85/01 43/42.06 |
| 7,380,365 | B2 | 6/2008 | Noraker | |
| 7,520,086 | B2 | 4/2009 | Melhorn et al. | |
| 7,562,489 | B2 | 7/2009 | Turner | |
| 7,716,868 | B2 | 5/2010 | Emmott | |
| 7,752,801 | B2 * | 7/2010 | Choi | A01K 85/01 43/42.34 |
| 7,788,841 | B1 * | 9/2010 | Donarummo | A01K 85/01 43/42.06 |
| 8,333,031 | B2 | 12/2012 | Carlson | |
| 8,474,174 | B2 * | 7/2013 | Norman | A01K 85/01 43/42.06 |
| 8,490,319 | B2 | 7/2013 | Mancini et al. | |
| 8,627,594 | B1 | 1/2014 | Weron | |
| 8,769,862 | B2 | 7/2014 | Blanchar | |
| 8,789,307 | B1 * | 7/2014 | Talbot | A01K 85/01 43/42.09 |
| 8,813,418 | B2 * | 8/2014 | Sundstrom | A01K 85/01 43/42.06 |
| 8,910,415 | B2 * | 12/2014 | Farr, Jr. | A01K 85/00 43/42.06 |
| 2002/0073607 | A1 * | 6/2002 | Hickok | A01K 85/00 43/42.25 |
| 2003/0009927 | A1 * | 1/2003 | Rice | A01K 85/01 43/42.06 |
| 2003/0046858 | A1 * | 3/2003 | Meraw | A01K 85/02 43/42.28 |
| 2003/0126785 | A1 * | 7/2003 | Poinski | A01K 85/16 43/42.06 |
| 2007/0163165 | A1 | 7/2007 | Castro et al. | |
| 2007/0180757 | A1 * | 8/2007 | Kalazich | A01K 83/06 43/42.06 |
| 2008/0000140 | A1 * | 1/2008 | Mitchell | A01K 85/01 43/42.06 |
| 2008/0236020 | A1 | 10/2008 | Murrell | |
| 2009/0037960 | A1 | 2/2009 | Melby | |
| 2010/0154285 | A1 * | 6/2010 | Greenfield | A01K 85/00 43/42.24 |
| 2010/0293833 | A1 * | 11/2010 | Bossone, III | A01K 85/01 43/42.06 |
| 2011/0185622 | A1 | 8/2011 | Somogyi | |
| 2011/0296736 | A1 | 12/2011 | Sundstrom | |
| 2012/0030991 | A1 * | 2/2012 | Chatfield | A01K 85/00 43/42.39 |
| 2012/0102814 | A1 * | 5/2012 | Christensen | A01K 97/06 43/25.2 |
| 2014/0000148 | A1 | 1/2014 | Signitzer | |
| 2014/0000149 | A1 | 1/2014 | Signitzer | |
| 2014/0223799 | A1 * | 8/2014 | Bossone, III | A01K 85/12 43/42.19 |
| 2014/0311010 | A1 * | 10/2014 | Talbot | A01K 85/01 43/42.06 |
| 2015/0082684 | A1 * | 3/2015 | Madala | A01K 85/18 43/42.35 |
| 2015/0150226 | A1 * | 6/2015 | McLeod | A01K 85/16 43/42.06 |

FOREIGN PATENT DOCUMENTS

| | | | | |
|---|---|---|---|---|
| DE | 3718968 A1 * | 12/1988 | | A01K 85/16 |
| JP | 2003250388 A * | 9/2003 | | |
| JP | 2007209228 A * | 8/2007 | | |
| JP | 2008283876 A * | 11/2008 | | |
| JP | 2012075407 A * | 4/2012 | | |
| JP | 2013165684 A * | 8/2013 | | |
| JP | 2014217292 A * | 11/2014 | | |
| SE | WO 9732471 A1 * | 9/1997 | | A01K 85/01 |
| WO | WO9732471 A1 | 9/1997 | | |
| WO | WO2005077163 A1 | 8/2005 | | |

* cited by examiner

FISHING LURE WITH BLOW-HOLE VENTED BAIT CHAMBER AND O-RING HATCH LOCKING MECHANISM

CROSS-REFERENCE TO RELATED APPLICATION

This application claims the benefit of U.S. Provisional Application No. 62/045,485, filed Sep. 3, 2014, and incorporated herein by reference.

FIELD OF THE INVENTION

The present invention relates to equipment for sport fishing. More particularly, the present invention relates to fishing lures.

BACKGROUND

Fishing lures are designed to attract game fish, get them to strike and capture them, typically with a barbed hook. Most lures are made with colors and shapes designed to attract fish. Many are shaped so that they wobble and wiggle as they are pulled through the water, mimicking the actions of a bait animal such as a minnow. Some lures have contrivances that give off scents to attract game fish.

One such contrivance for emitting scents is to fashion an elongate chamber in the body of the lure and a perforated container configured to be inserted therein, as described in U.S. Pat. No. 5,471,780 to Hobson. The perforated container can be loaded with a scent producing material, then the loaded container is inserted into the chamber. Vents penetrate the side of the lure into the elongate chamber providing a way for scent to diffuse out of the perforated container. However, Hopson's lure has several disadvantages. The perforated container is rather small and cannot contain much scent producing material. The vents allow for diffusion, which may be an adequate mechanism for a stationary lure, but not for a moving lure. Hopson's lure does not have any structure that takes advantage of the motion of the lure through the water to force water through the container. Additionally, the container is closed with a tiny cap that would be easy to drop and lose, particularly in the types of environments in which fishers often find themselves. Furthermore, the container has a tang that fits in a recess in the elongate chamber to hold the container in place. The container is removed by bending the lure. Of course, a fish striking the lure or fighting once hooked can exert forces on the lure, causing it to bend, thereby releasing and losing the container.

U.S. Pat. No. 8,490,319 to Mancini describes a fishing lure with a mouth opening in the head that communicates with side vent holes. Scent producing material may be inserted into the mouth opening. The motion of the lure through the water will drive water through the mouth, past the scent producing material, and out the side vents. This design takes advantage of the motion of the lure through the water to disperse scent into the water. However, the mouth opening is relatively small and so will not hold much scented material. Also, there is no mechanism for securing the scented material, so it is likely to fall out. In fact, the inventor appears to intend that a specially made "scent stick" be used. Most fishers would prefer to vary the type of scented material they use, experimenting to find what works best for a particular locale and type of game fish.

Application WO 97/32471 to Hägg describes a hollow lure composed of two mirror inverted shell parts, delimiting between them a long narrow cavity. A longitudinal partition wall separates an upper, air-filled chamber from a lower chamber into which scent producing material may be placed. The lower chamber has an inlet hole and an outlet hole, which flushes water through the lower chamber, facilitating the spreading of scent. However, the Hägg lure only provides for a small scent producing tablet to be inserted into the lower chamber via a removable nose part. Adding or removing other types of scent producing material, such as a piece of bait chum, would be difficult. Furthermore, since the lure is hollow, it is not as mechanically strong as a solid lure. The fishing line is attached to the nose end and the hooks are distributed along the body of the lure. A fish striking or fighting the lure can produce stresses in the hollow lure body that can break the lure.

U.S. Pat. No. 7,174,669 to Kallas describes a hollow lure comprising two half shells that snap together. The half shells can readily unsnap to introduce scent producing material into the chamber between the shells, then re-snap. The shells are additionally held together with one or more short pieces of surgical tubing. A recess in the shells holds the piece of surgical tubing in place. However, when the shells are taken apart to add or remove scent producing material, the piece of surgical tubing must be completely removed from the lure and set aside. There is a significant chance that the piece of surgical tubing will be lost while the lure is open. No hooks are attached directly to the lure, but to a common fishing line to which the lure is also attached. This avoids the problem of transmitting the forces from the fish fighting the lure through the thin walled lure. However, it is not as desirable to have the hooks separate from the lure as there is a substantial possibility that a fish will strike the lure but avoid the hooks.

U.S. Pat. No. 6,588,138 to Gilbert describes a fishing lure with a hollow body providing an interior chamber divided into a buoyancy chamber in a forward portion and a bait chamber in an aft portion. Access to the bait chamber is provided by a hinged cover in the bait chamber or a hinged connection between the forward portion of the lure body and the aft portion of the lure body. The Gilbert lure does not have any mechanism from holding closed the hinged cover or hinged aft portion, relying instead on motion through the water to hold closed. This has the disadvantage that when the lure is not moving through the water, the hinged hatch may open and the bait fall out.

BRIEF DESCRIPTION OF THE DRAWINGS

The present invention will be described by way of exemplary embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the exemplary embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment(s) is essential. Other embodiments are possible, their specific designs depending upon the particular application. As such, the scope of the invention should not be limited by the particular embodiments herein described but should be defined only by the appended claims and equivalents thereof.

Exemplary Embodiment

Figure 1:
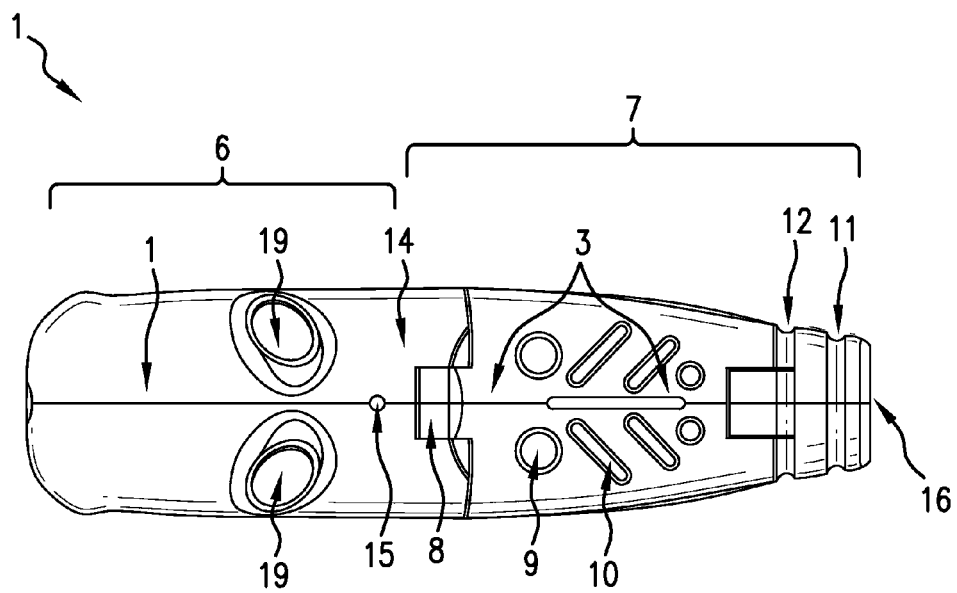
FIG. 1 shows a bottom view of the exemplary fishing lure.
Figure 2:
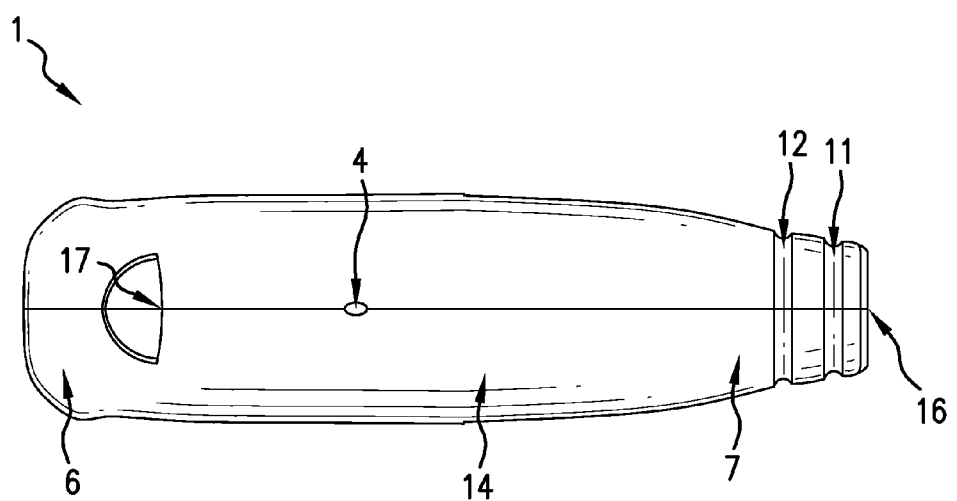
FIG. 2 shows a top view of the exemplary fishing lure.
Figure 3:
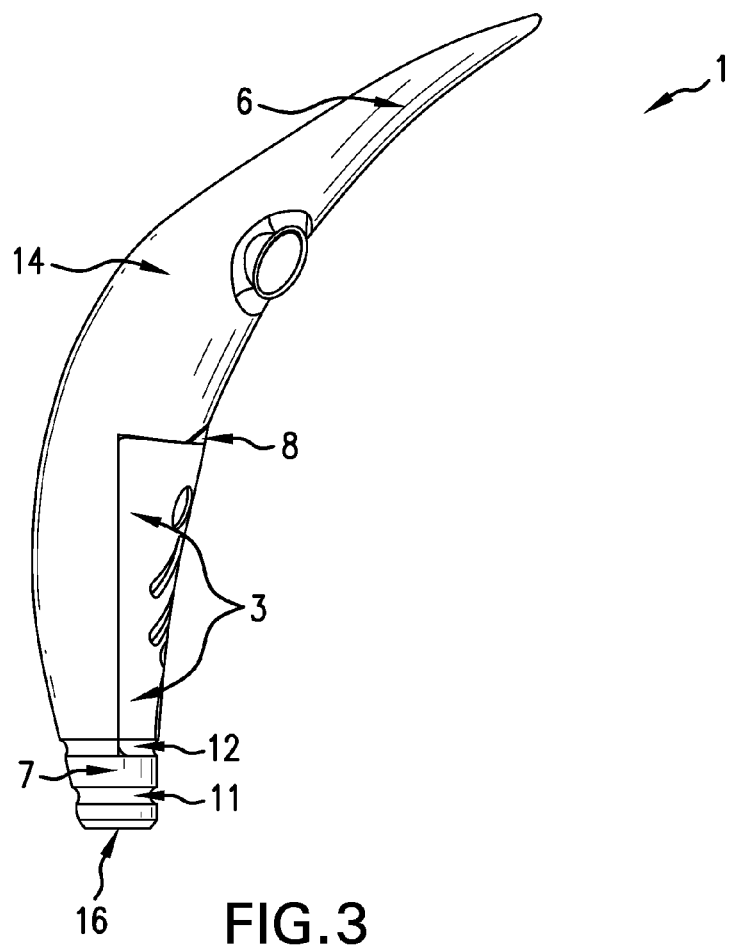
FIG. 3 shows a side view of the exemplary fishing lure.

FIGS. 1-6 show an exemplary embodiment of a novel fishing lure 1. The exemplary fishing lure 1 is designed to target salmon and steelhead with its diving, noise making, and scent dispersing actions, but can also be used for other fish species. FIG. 1 shows a bottom view of the exemplary fishing lure 1. The bottom view is also called the "belly view" as it shows a side of the fishing lure 1 that simulates the belly of a bait fish. FIG. 2 shows a top view of the exemplary fishing lure 1. The top view is also called the "back view" as it shows a side of the fishing lure 1 that simulates the back of a bait fish. FIG. 3 shows a side view of the exemplary fishing lure 1. The major components of the fishing lure 1 comprise a lure body 14 and a hatch 3, which are coupled with a hinge 8.

The lure body 14 has a lure body head 6 and a lure body tail 7. The lure body head 6 comprises a forward portion of the lure body 14 and the lure body tail 7 comprises an aft portion of the lure body 14. The lure body 14 in the exemplary embodiment is constructed as a solid monolithic part, but in other embodiments may be constructed as a hollow lure body comprising of two or more parts. The lure body 14 is molded, but in other embodiments may be constructed using other methods. In the exemplary embodiment, the lure body 14 is made of buoyant urethane plastic, but in other embodiments may be made of other suitable materials. The lure body 14 is banana shaped and lipless, the banana shape facilitating wobbling, wiggling and diving motion as the exemplary fishing lure 1 is pulled through the water. The lure body head 6 has simulated eyes 19 to further disguise the exemplary fishing lure 1 as a bait fish. The lure body 14 has several attachment points for hooks and lines, including a belly attachment point 15, a tail attachment point 16, and a head attachment point 17. In the most typical configuration, hooks would be attached to the belly attachment point 15 and the tail attachment point 16, while the fishing line is attached to the head attachment point 17.

Figure 5A:
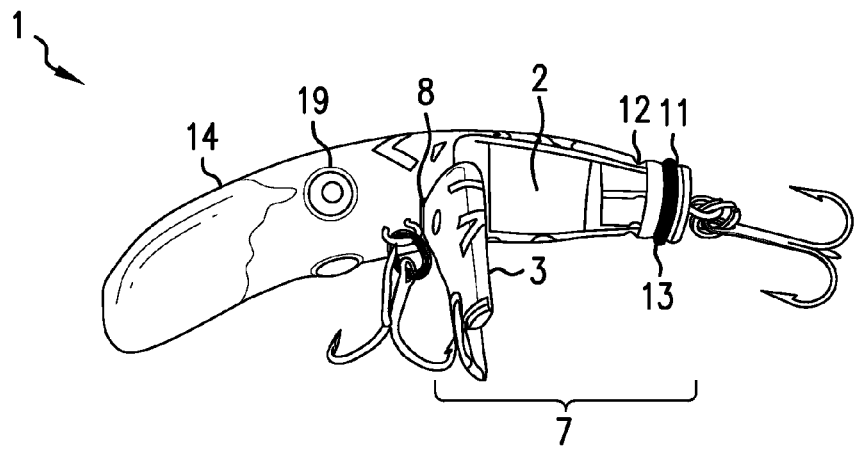
FIG. 5A shows the exemplary fishing lure with the hatch in an open position and the O-ring in the first (unlocked position) O-ring groove.
Figure 5B:
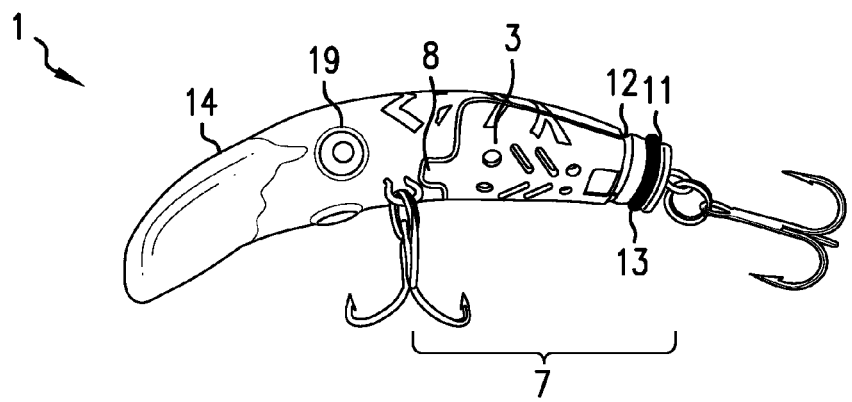
FIG. 5B shows the shows the exemplary fishing lure with the hatch in a closed position and the O-ring still in the first (unlocked position) O-ring groove.
Figure 5C:
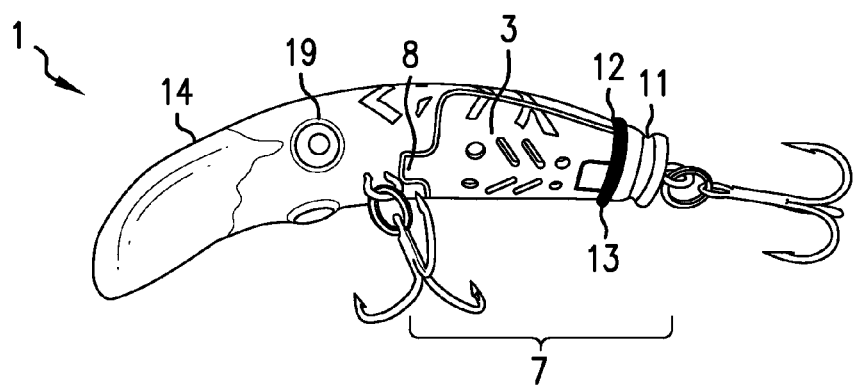
FIG. 5C shows the exemplary fishing lure with the hatch in the closed position and the O-ring in the second (locked position) O-ring groove.

The lure body 14 has a bait chamber 2 in the underside of the lure tail 7. The bait chamber 2 is a recess in the lure body 14 open to the underside, as shown in FIG. 5A. The hatch 3 covers the bait chamber 2 when the hatch 3 is in a closed position, as shown in FIGS. 1, 5B and 5C. With the hatch 3 in an open position, as shown in FIG. 5A, bait or scented material may be inserted into the bait chamber 2. With the hatch 3 in the closed position, the bait or scented material is secured.

Figure 6:
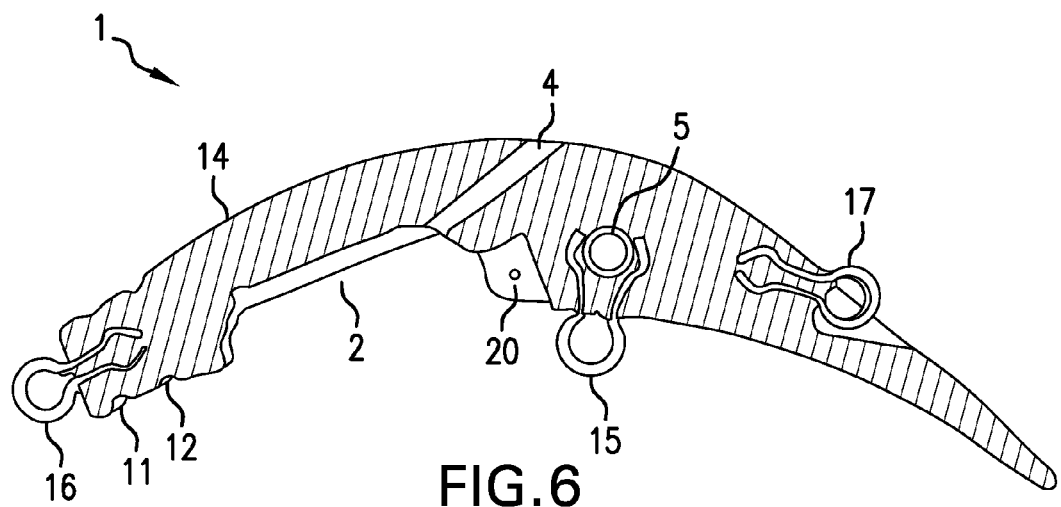
FIG. 6 shows a sectional view of the exemplary fishing lure.

The lure body 14 has a blowhole tunnel 4 that passes from the back side of the lure body 14 into the bait chamber 2 (also see FIG. 6). The blowhole tunnel 4 forward opening is forward of the bait chamber 2 so that as the exemplary fishing lure 1 moves forward through the water, water is forced through the blowhole tunnel 4. This facilitates the flushing of scent from the bait or scent producing material into the water behind the exemplary fishing lure 1. The blowhole tunnel may be used as a scent injection hole to refill the bait chamber with scent material without having to open the hatch.

The lure body tail 7 has two grooves that wrap around the lure body tail 7, specifically a first (unlocked position) O-ring groove 11 and a second (locked position) O-ring groove 12. There are gaps in the second locked position O-ring groove 12 on the lure body tail 7 because part of the second (locked position) O-ring groove 12 is on a rear portion of the hatch 3 (see FIGS. 4 and 5A).

Figure 4:
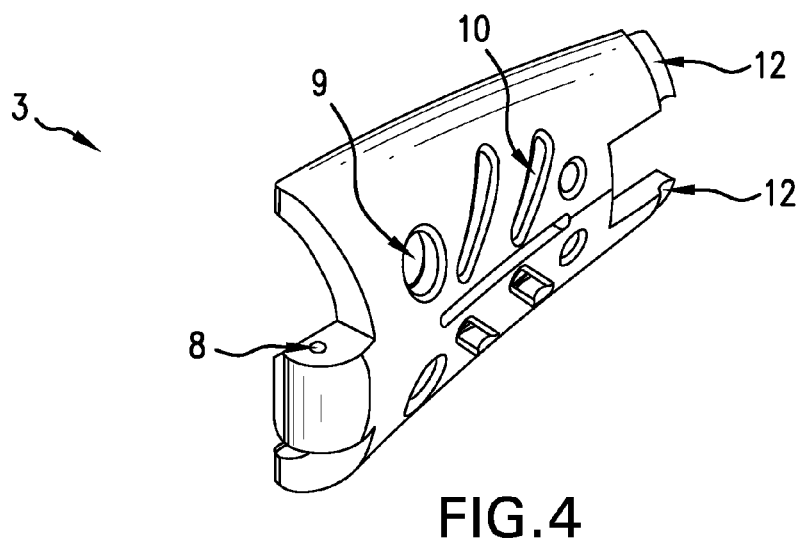
FIG. 4 shows a perspective view of the hatch.

FIG. 4 shows a perspective view of the hatch 3. The hatch 3 has a plurality of holes 9 and slits 10. These hatch holes 9 and hatch slits 10 facilitate the flow of water carrying scent out of the bait chamber 2. As previously mentioned, part of the second (locked position) O-ring groove 12 is on a rear portion of the hatch 3. This is to facilitate the securing of the hatch 3 to the lure body 14.

FIGS. 5A-5C show the securing of the hatch 3 with an O-ring 13. The O-ring 13 is flexible and stretchable, made of suitable material such as PTFE, Nitrile (Buna), Neoprene, EPDM Rubber or Fluorocarbon (Viton). The O-ring 13 is sized to fit snugly on either the first unlocked position O-ring groove 11 or the second locked position O-ring groove 12, but not so tight that it cannot be removed from the groove by the fingers of a typical user.

FIG. 5A shows the exemplary fishing lure 1 with the hatch 3 in an open position and the O-ring 13 in the first (unlocked position) O-ring groove 11. While the exemplary fishing lure 1 is in this configuration, bait or scent producing material can be placed in the bait chamber 2. The first (unlocked position) O-ring grooves 11 serves as a convenient place to store the O-ring 13 while the hatch 3 is in the open position. O-ring 13 is unlikely to be misplaced or lost while loading bait or scent producing material since the O-ring 13 is never removed from the exemplary fishing lure 1.

FIG. 5B shows the shows the exemplary fishing lure 1 with the hatch 3 in a closed position and the O-ring 13 still in the first (unlocked position) O-ring groove 11. In this configuration, the hatch 3 is closed, but not locked. To lock the hatch 3 from this configuration, a user can employ their fingers to roll the O-ring 13 out of the first (unlocked position) O-ring groove 11 and into the second (locked position) O-ring groove 12, including the portions of the second locked position O-ring groove 12 on the rear portion of the hatch 3.

FIG. 5C shows the exemplary fishing lure 1 with the hatch 3 in the closed position and the O-ring 13 in the second (locked position) O-ring groove 12. In this configuration, the hatch 3 is locked in the closed position since the O-ring 13 crosses over the rear portion of the hatch 3 that has part of the second (locked position) O-ring groove 12. The O-ring 13 holds the rear portion of the hatch 3 to the lure body tail 7. The hatch 3 can be unlocked again by rolling the O-ring 13 back from the second (locked position) O-ring groove 12 to the first (unlocked position) O-ring groove 11.

FIG. 6 shows a sectional view of the exemplary fishing lure 1. As shown in this view, the attachment points 15, 16, and 17 have metal eye loops molded into the lure body 14, but in other embodiments, screwed-in eyes, clips or other attachment mechanisms may be used. A hinge pin hole 20 penetrates into the lure body 14 on one side of a forward part of the bait chamber 2. A hinge pin (not shown) passes through the hinge 8 of the hatch 3 and into the hinge pin hole 20 on either side of the hinge 8. This arrangement facilitates the hatch 3 moving between its open position and its closed position. A rattling capsule 5 is molded into the lure body 14. The rattling capsule 5 makes rattling noises while the exemplary fishing lure 1 wobbles as it is pulled through the water. The rattling noises help attract fish. In some embodiments, more than one rattling capsule 5 is embedded in the lure body 14. The rattling capsule 5 is shown as embedded in the middle of the lure body 14, but in other embodiments, may be embedded in other parts of the lure body 14.

Figure 7:
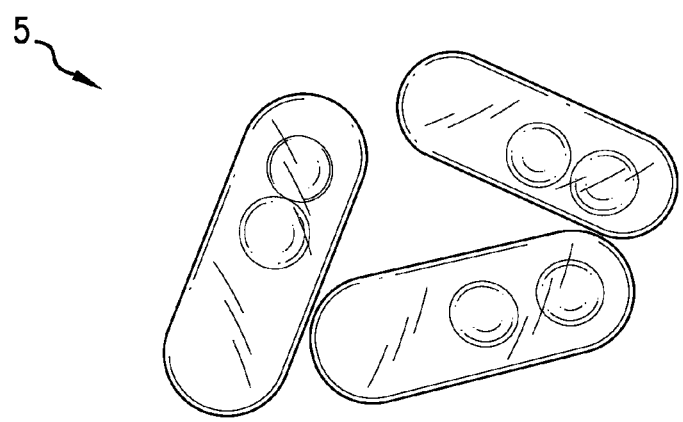
FIG. 7 shows a perspective view of typical rattling capsules.

FIG. 7 shows a perspective view of typical rattling capsules 5 prior to embedding in the lure body 14 during the molding of the lure body 14. The rattling capsule 5 comprises a glass capsule with metal beads deposited therein.

What is claimed is:

1. A fishing lure comprising:
a lure body with a lure body head, a lure body tail and a bait chamber, wherein the bait chamber is a recess in the lure body tail;
a hatch coupled to the lure body with a hinge, the hatch configured to swing on the hinge between an open position and a closed position, the hatch configured to cover the bait chamber when in the closed position, the hatch configured to expose the bait chamber when in the open position, the hatch with one or more holes penetrating through the hatch;
an O-ring;
a first groove wrapping around the lure body tail, wherein the fishing lure is configured such that when the O-ring is in the first groove, the hatch is free to move between the closed position and the open position; and
a second groove comprising a first portion in the lure body tail and a second portion in the hatch, the second groove wrapping around the lure body tail and hatch forward of the first groove, wherein the fishing lure is configured such that when the hatch is in the closed position and the O-ring is in the second groove, the O-ring holds the hatch against the lure body.

2. The fishing lure of claim 1, wherein:
the lure body comprises buoyant plastic.

3. The fishing lure of claim 2, wherein:
the buoyant plastic comprises buoyant urethane plastic.

4. The fishing lure of claim 2, wherein:
the lure body is a solid, monolithic piece.

5. The fishing lure of claim 1, further comprising:
a blowhole tunnel through the lure body from the lure body head to the bait chamber.

6. The fishing lure of claim 1, further comprising:
one or more rattling capsules embedded in the lure body.

7. A fishing lure comprising:
a lure body with a lure body head, a lure body tail and a bait chamber, wherein the bait chamber is a recess in the lure body tail, the lure body comprising buoyant urethane plastic;
a hatch coupled to the lure body with a hinge, the hatch configured to swing on the hinge between an open position and a closed position, the hatch configured to cover the bait chamber when in the closed position, the hatch configured to expose the bait chamber when in the open position, the hatch with one or more holes penetrating through the hatch;
an O-ring;
a first groove wrapping around the lure body tail, wherein the fishing lure is configured such that when the O-ring is in the first groove, the hatch is free to move between the closed position and the open position; and
a second groove comprising a first portion in the lure body tail and a second portion in the hatch, the second groove wrapping around the lure body tail and hatch forward of the first groove, wherein the fishing lure is configured such that when the hatch is in the closed position and the O-ring is in the second groove, the O-ring holds the hatch against the lure body.

8. The fishing lure of claim 7, wherein:
the lure body is a solid, monolithic piece.

9. The fishing lure of claim 8, further comprising:
a blowhole tunnel through the lure body from the lure body head to the bait chamber.

10. The fishing lure of claim 9, further comprising:
one or more rattling capsules embedded in the lure body.

* * * * *